United States Patent
Song et al.

(10) Patent No.: US 7,483,228 B2
(45) Date of Patent: Jan. 27, 2009

(54) HARD DISK DRIVE WITH REDUCED POWER CONSUMPTION, RELATED DATA PROCESSING APPARATUS, AND I/O METHOD

(75) Inventors: Dong-Hyun Song, Yongin-si (KR); Young-Joon Choi, Seongnam-si (KR); Bum-Soo Kim, Seongnam-si (KR); Myung-Jin Jung, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 45 days.

(21) Appl. No.: 11/316,896

(22) Filed: Dec. 27, 2005

(65) Prior Publication Data

US 2006/0209444 A1 Sep. 21, 2006

(30) Foreign Application Priority Data

Mar. 17, 2005 (KR) .................. 10-2005-0022409

(51) Int. Cl.
*G11B 27/36* (2006.01)
*G06F 12/00* (2006.01)

(52) U.S. Cl. ............................. 360/31; 711/112
(58) Field of Classification Search .............. None
See application file for complete search history.

(56) References Cited

U.S. PATENT DOCUMENTS

| 6,377,530 | B1 | 4/2002 | Burrows |
| 6,594,724 | B1* | 7/2003 | Smith ................... 711/112 |
| 6,681,334 | B2* | 1/2004 | Nakamura ............. 713/300 |
| 7,000,067 | B2* | 2/2006 | Choo et al. ............ 711/112 |
| 2006/0080501 | A1* | 4/2006 | Auerbach et al. ...... 711/112 |

FOREIGN PATENT DOCUMENTS

| KR | 1020010038434 A | 5/2001 |
| KR | 1020040106161 A | 12/2004 |
| WO | WO-2004/057455 | 7/2004 |

* cited by examiner

*Primary Examiner*—Jason C Olson
(74) *Attorney, Agent, or Firm*—Volentine & Whitt, PLLC

(57) ABSTRACT

A hard disk drive is disclosed and related methods of reading/writing data are disclosed. The hard disk drive includes a disk serving as a main data storage medium, and first and second buffers storing data to be stored on the disk, as well as a controller defining a data I/O path in relation to a detected operating state of the hard disk drive.

22 Claims, 7 Drawing Sheets (Present Invention)

(Present Invention)

HARD DISK DRIVE WITH REDUCED POWER CONSUMPTION, RELATED DATA PROCESSING APPARATUS, AND I/O METHOD

BACKGROUND OF THE INVENTION

1. Field of the Invention

Embodiments of the invention relate to a data storage device. More particularly, embodiments of the invention relate to a hard disk drive with reduced power consumption, a data processing apparatus incorporating the hard disk drive, and a related data input/output (I/O) method.

2. Description of the Related Art

With the advent of the information society, the amount of data individuals need to store and carry has increased dramatically. This need drives a continuing demand for data storage media. Various personal data storage devices have been developed to meet this demand. One example of a data storage device is the hard disk drive (HDD). The HDD is widely used because of its high storage density, high data transmission rate, rapid data access time, and low price. Technically, a HDD is a device that controls the position of a storage disk (i.e., the actual hard disk) during read and write operations directed to data stored on the disk. However, since the HDD and the disk are integrated in a single unit, the term "HDD" is generally understood to include both the hard disk and its drive.

The record-type hard disk contained in the conventional HDD is maintained in an internal vacuum space isolated from the external environment. A Read/Write (R/W) head writes data to and reads data from the disk. A mechanical arm assembly moves the R/W head across the surface of the disk. The conventional disk includes at least one aluminum plate coated with magnetic material. This combination serves as the main data storage medium. The aluminum plate is also called a "platter". The structure of a conventional HDD is disclosed, for example, in U.S. Pat. No. 4,638,383, the subject matter of which is incorporated herein by reference.

HDDs may be classified into integrated drive electronics (IDE) type HDDs and small computer system interface (SCSI) type HDDs according to their respective interface types. The IDE type HDD includes an installed controller. Accordingly, unlike the SCSI type HDD, the IDE type HDD does not need a separate extension card. The IDE type HDD is also referred to as an advanced technology attachment (ATA). The ATA is a formal interface name defined by the Small Form Factor (SFF) Committee. Recently, a serial-ATA interface defining serial data transmissions has been incorporated into HDD devices.

Contemporary HDDs are mounted not only in desk top computers, but also in mobile devices having various data processing functions, such a notebook computers, MP3 players, cellular phones, personal digital assistants (PDAs), and GPS navigators. Such mobile devices draw power from a finite power source such as a battery. Accordingly, when the stored energy of the battery is expended, the mobile device will not operate. Thus, power consumption for such mobile devices is an ever-present design consideration.

Moderating power consumption by mobile device is a difficult task since overall processing speeds are increasing and the mobile devise are required to perform an ever increasing numbers of tasks. Miniaturization of components has helped reduce power consumption. For example, the development of the system on chip (SOC) technology has reduced total power consumption, but the ratio of total power consumption by the mobile device to power consumption by the constituent HDD has actually increased. Accordingly, further efforts are required to minimize the power consumption of data storage devices, such as HDDs, incorporated in mobile devices.

SUMMARY OF THE INVENTION

Embodiments of the invention provides an apparatus and related method adapted to further reduce the power consumption of a data storage device (e.g., a hard disk drive), and thereby extend the battery operating life of a mobile device. In one related aspect, embodiments of the invention provide an apparatus and related method adapted to define an efficient data I/O path in accordance with various operating state for the data storage device.

Thus, in one embodiment, the invention provides a hard disk drive comprising; a disk, a first buffer adapted to temporarily store data to be stored on the disk, a second buffer adapted to store data received from at least the first buffer, and a controller adapted to provide the data temporarily stored in the first buffer to at least one of the disk and the second buffer in accordance with an operating state for the disk.

In another embodiment, the invention provides a data processing apparatus comprising; a host adapted to generate a write request and a read request, and a hard disk drive adapted to write data in response to the write request and read data in response to the read request through a normal data path or a bypass data path in accordance with an operating state for the hard disk drive. The hard disk drive may comprise; a disk, a first buffer adapted to temporarily store data to be stored on the disk, a second buffer adapted to store data received from at least the first buffer, and a controller adapted to provide the data temporarily stored in the first buffer to at least one of the disk and the second buffer in accordance with an operating state for the disk.

In yet another embodiment, the invention provides a method for writing data to and reading data from a hard disk drive comprising a disk, the method comprising; storing data received from a host in a first buffer, detecting an operating state for the disk, and storing the data in the first buffer in at least one of a second buffer and the disk in accordance with the detected operating state.

In still another embodiment, the invention provides a method of reading/writing data, the method comprising; generating a data read/write request in a host, and reading the data from or writing the data to a hard disk drive in response to the read/write request, wherein the data is read from or written to the hard disk drive through a normal data path or a bypass data path in accordance with an operating state of the hard disk drive.

BRIEF DESCRIPTION OF THE DRAWINGS

Several embodiments of the invention are described with reference to the accompanying drawings, in which.

Figure (FIG.) 1 is a block diagram of a data processing apparatus according to an embodiment of the invention.

DESCRIPTION OF EXEMPLARY EMBODIMENTS

Reference will now be made in some additional detail to embodiments of the present invention. However, the invention is not limited to only the embodiments described.

According to one embodiment of the invention, a HDD comprises a disk serving as a main data storage medium, first and second buffers adapted to temporarily store data to be stored on the disk, and a controller adapted to provide data input to the first buffer to one of either the disk or the second buffer in accordance with the operating state of the disk. In this regard, the second buffer stores part of the data to be stored on the disk, and simultaneously provides the stored data to the disk. Accordingly, it is possible to reduce the occurrence ratio of an active state relative to the overall operating state for the HDD, wherein the HDD consumes a relatively large amount of power during the so-called "active state". By reducing the occurrence ratio power consumption by the HDD it is possible significantly reduce for data processing apparatuses incorporating the HDD. In one more specific embodiment, the second buffer is implemented using a nonvolatile memory, thereby providing excellent data recoverability.

Figure 1:
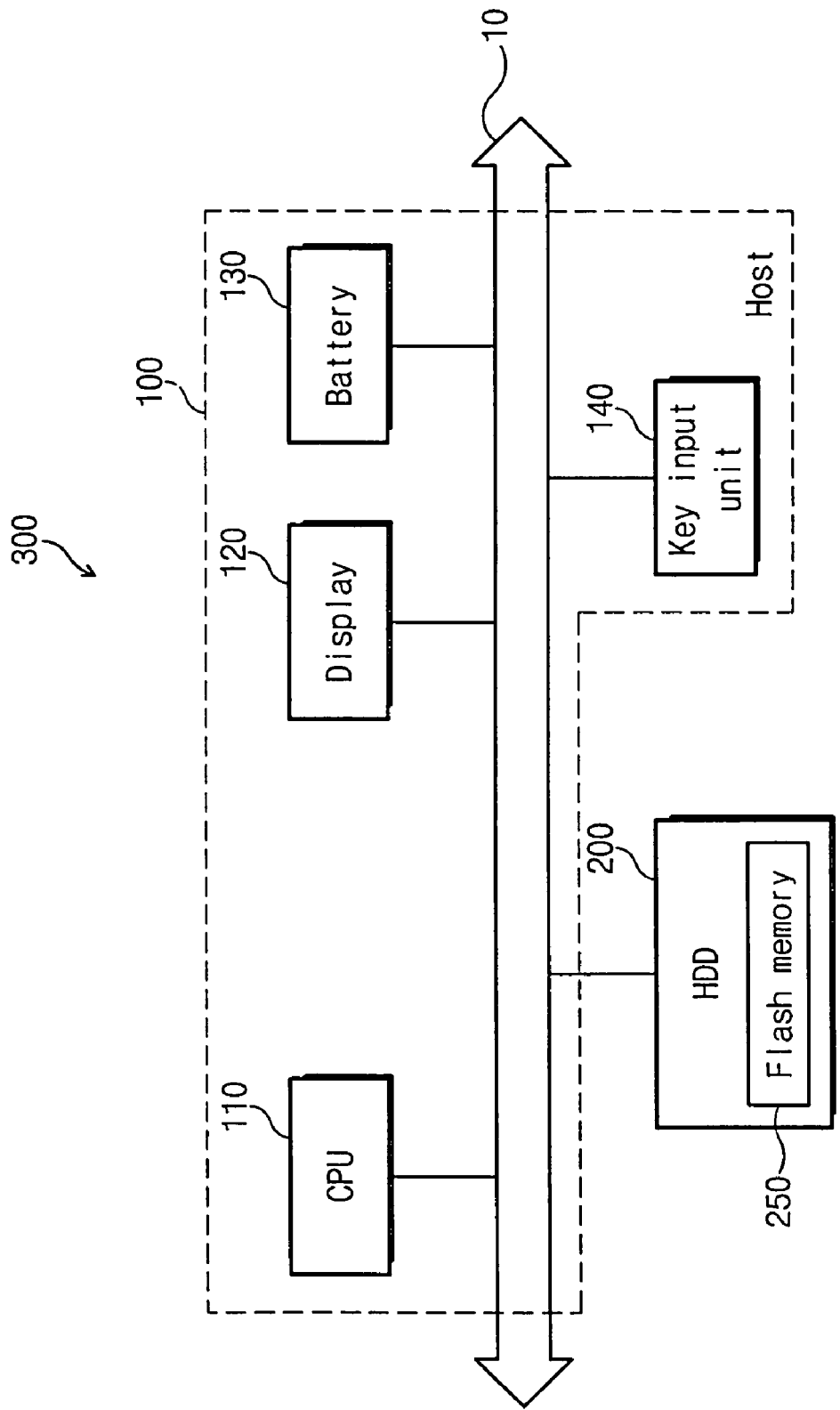

FIG. 1 is a block diagram illustrating a data processing apparatus 300 according to one embodiment of the invention, and more specifically a portable or mobile data processing apparatus 300 incorporating a hard disk drive (HDD) 200.

Referring to FIG. 1, data processing apparatus 300 may be divided into two parts; a host 100 and hard disk drive (HDD) 200. Host 100 generally comprises a central processing unit (CPU) 110, a display 120, a battery 130, and a key input unit 140. Host 100 and HDD 200 are conventionally connected via a bus 10. Examples of an interface between the host 100 and the HDD 200 include an IDE interface, an SCSI interface, an ATA interface, and serial-ATA interface.

Figure 7:
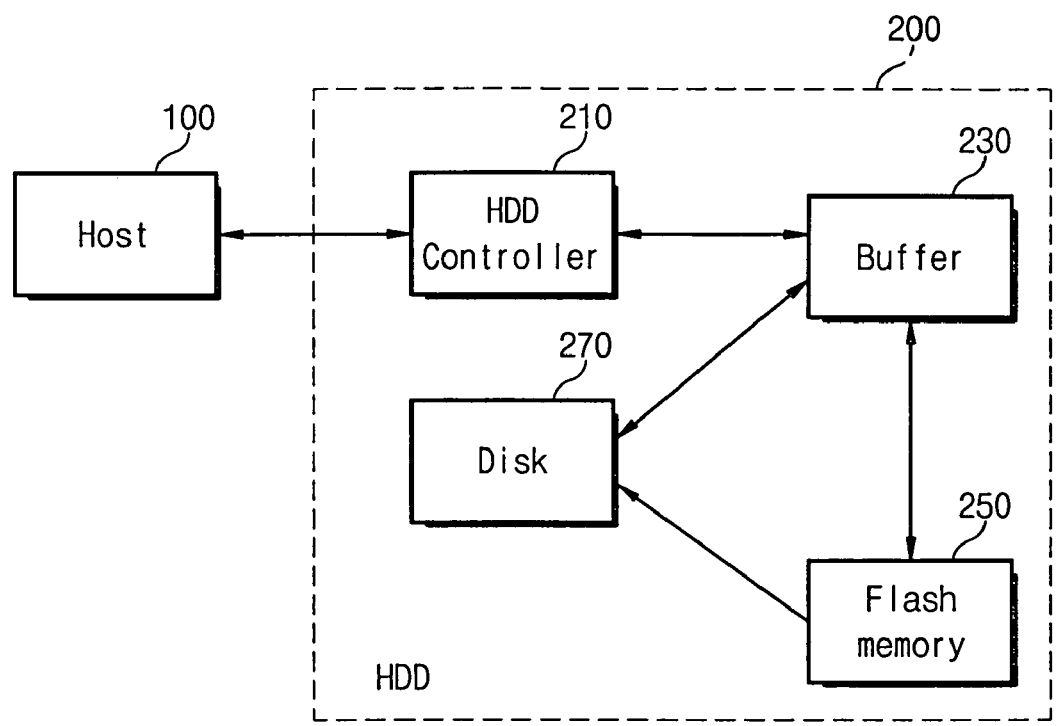
FIG. 7 is a block diagram of a data processing apparatus according to one embodiment of the invention.

Referring to FIG. 7 for the moment, HDD 200 comprises a disk 270 adapted to store data and flash memory 250 adapted to serve as an intermediate data storage medium. Flash memory 250 stores part of the data to be stored in HDD 200, and simultaneously provides the stored data to HDD 200. Flash memory 250 may be implemented using conventional nonvolatile memory devices that retain written (or programmed) data within internal memory cells even when power to the memory is turned off. Accordingly, flash memory 250 has better data recoverability than other forms of volatile memory. However, various nonvolatile memories other than flash memory may also be used as an intermediate data storage medium within HDD 200. However, in one embodiment of the invention flash memory 250 comprises NAND-type flash memory capable of performing high-speed program/erase operations. This embodiment enables HDD 200 to collectively and simultaneously process data requests from host 100. For example, a data write operation and a data read operation may be simultaneously processed, thereby reducing the power consumed by HDD 200 and, therefore, data processing apparatus 300.

Figure 2:
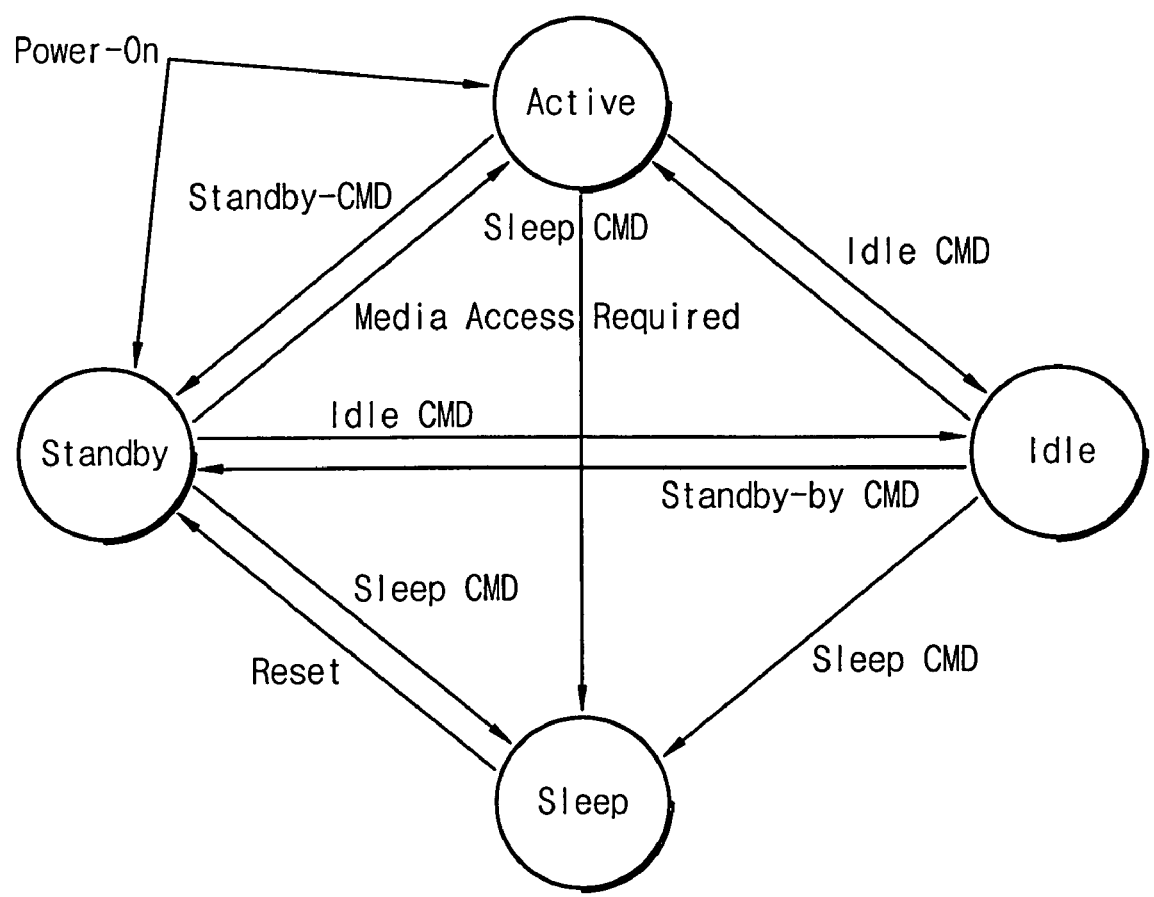
FIG. 2 is a state diagram further illustrating operation of the HDD illustrated in FIG. 1.

FIG. 2 is a state diagram illustrating one exemplary set of operating states for HDD 200. The operating states are defined in relation to power management states (and, optionally, related power management standards) for HDD 200. The advanced power management (APM) standard and the advanced configuration and interface (ACPI) standard are two ready examples.

The exemplary operating states for HDD 200 and power consumption associated with each operating state will now be described with reference to FIG. 2. Referring to FIG. 2, four operating states are defined for HDD 200, including; an active state, a standby state, an idle state, and a sleep state. In great measure, the operating states for HDD 200 can be regarded as the operating states for disk 270.

In the active state, HDD 200 may perform a data write operation, a data read operation, and a data seek operation in response to commands received from host 100. The active state typically consumes "full power" ranging from 2 to 2.5 W.

HDD 200 enters the idle state after about five seconds following the completion of one or more data write operation(s), data read operation(s), and data seek operation(s) performed during an active state. In the idle state, HDD 200 waits for a new command from host 100 after executing all received command(s). In the idle state, a disk arm (not illustrated) is moved to a parking position and a servo tracking function is turned OFF. Under these conditions, since an interface routine between host 100 and HDD 200 remains in a ready state, HDD 200 can return to the active state within a very short period of time (e.g., about 40 msec). Power consumed in the idle state is generally less than 1 W.

In the standby state, most components within HDD 200, including its spindle motor, are powered OFF. Under these conditions, it typically takes between 1.5 and 5 seconds for HDD 200 to return to the active state. Power of about 0.3 W is consumed in the standby state.

In the sleep state, all components within HDD 200, other than components processing a wake-up command received from host 100, are powered OFF. Accordingly, it takes a relatively long time (e.g., more than 5 seconds) for HDD 200 to return to the active state from the sleep state. Power of about 0.1 W is consumed in the sleep state.

Typical power consumption for HDD 200 in each of the foregoing operating states is summarized below in Table 1. (The power consumption figures contained in Table 1 were developed by examining a 2.5" HDD, model MHT20AH manufactured by Fujitsu).

TABLE 1

| Operating State | Spin-up | Active | Idle | Standby | Sleep |
|---|---|---|---|---|---|
| Power Consumption | 5 W (Max) | 2.3 W | 0.85 W | 0.25 W | 0.1 W |

From the foregoing it can be understood that as the occurrence ratio of the active state to the overall operating state of HDD 200 increases, the total power consumed by data processing apparatus 200 incorporating HDD 200 will increase. Also, as the respective occurrence ratios of the standby state or the sleep state to the overall operating state of HDD 200 increase, the total power consumed by data processing apparatus 200 will decrease.

Thus, the power consumption of HDD 200 is closely related to the occurrence frequencies of the respective operating states. By reducing the occurrence frequency of the active state, power consumption for HDD 200 may be reduced. The relationship between the occurrence frequency of the active state and the power consumption for HDD 200 will now be described in some additional detail.

Figure 3:
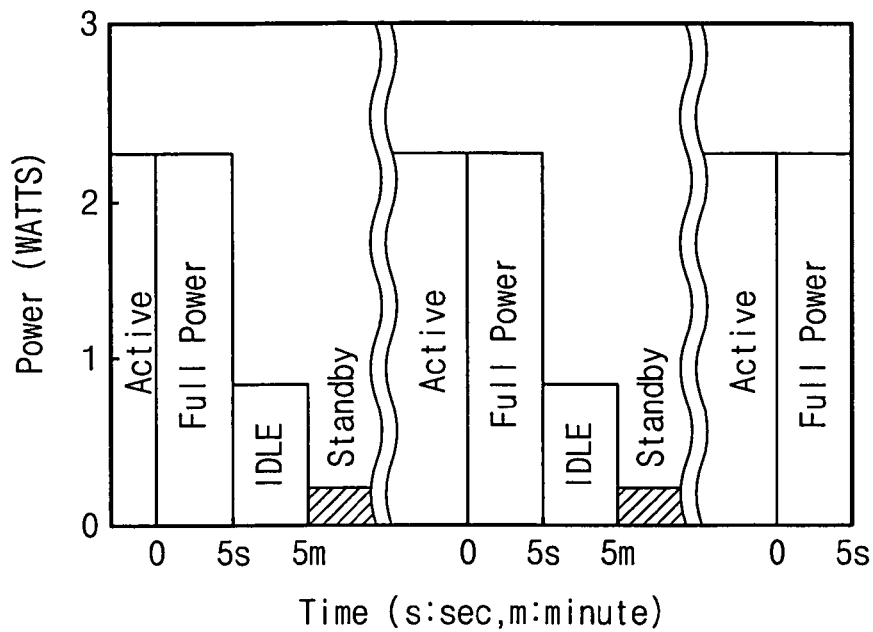
FIGS. 3 and 4 are diagrams comparing a stage change for a conventional HDD wherein a data write/read request is repeatedly generated from a host with a similar stage change for a HDD according to an embodiment of the invention.
Figure 4:
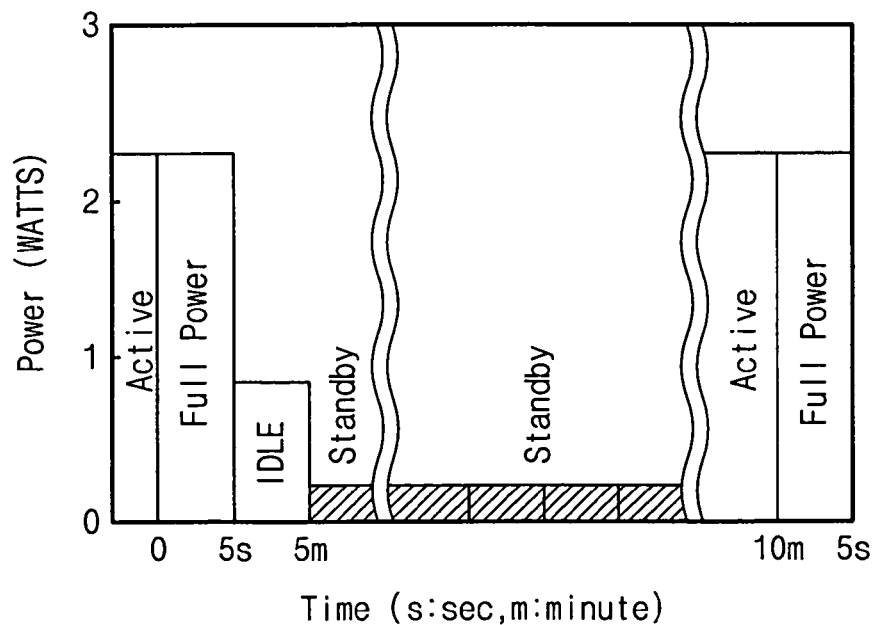
Figure 5:
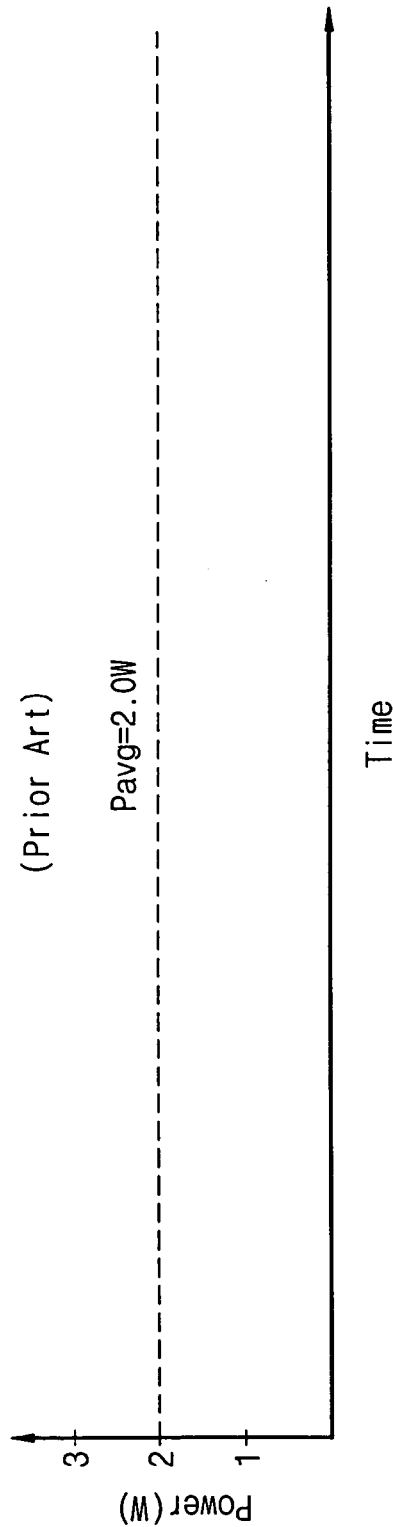
FIG. 5 is a graph illustrating power consumption for the HDD illustrated in FIG. 3.
Figure 6:
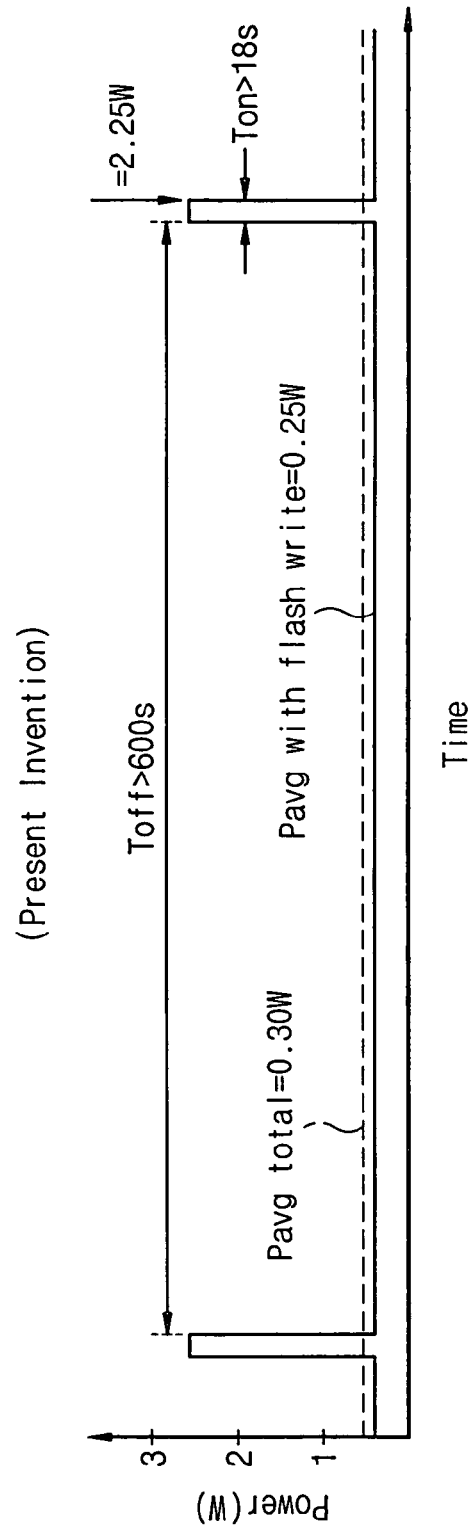
FIG. 6 is a graph illustrating power consumption for the HDD illustrated in FIG. 4.

FIG. 3 is a diagram illustrating operating state changes for a conventional HDD when a data write/read request is repeatedly generated by host 100. FIG. 4 is a diagram illustrating operating state changes for a HDD designed in accordance with an embodiment of the invention and operating in response to similar data write/read request from host 100. FIG. 5 is a graph illustrating power consumption for the conventional HDD. FIG. 6 is a graph illustrating power consumption for the HDD designed in accordance with an embodiment of the invention.

Referring to FIGS. 3 and 5, it is apparent that power consumption for the respective HDDs is actually determined according to the operating states of the disk. Whenever a data write/read request is generated by host 100, the conventional HDD enters the active state. Whenever the HDD enters the active state, a full-power cycle consumes about 2.5 W over a predetermined period of operating time. Accordingly, even when the HDD processes a small amount of data, it consumes full power over the entire predetermined period of time. During a complete cycle through which the conventional HDD transitions from the active state to the idle state to the standby state, an average power of 2.0 W is consumed.

Referring now to FIGS. 4 and 6, whenever a data write/read request is generated by host 100, HDD 200 performs the corresponding write/read operation using flash memory 250, instead of writing data into and reading data from disk 270. However, once flash memory 250 is full, the data stored in flash memory 250 is transferred to disk 270 which serves as a "main memory" in relation to flash memory 250 which serves as a "temporary memory."

But until flash memory 250 is full, actual write/read operations to/from HDD 200 are performed using only flash memory 250. In contrast, disk 270 of HDD 200 may remain in the standby state. That is, upon receiving a reset command (CMD), HDD 200 transitions to the standby state and flash memory 250 performs the data input/output operations. Accordingly, it is possible to reduce the occurrence ratio of the active state and thereby reduce the power consumption of the data processing apparatus incorporating HDD 200. Experimental results show that under the foregoing assumptions HDD 200 enters the active state about once every ten minutes on average. Under these conditions, the average power consumption for HDD 200 falls to a mere 0.3 W, or about 6.67% of the power consumption by the conventional HDD.

Thus, one principle established from the foregoing generally suggests that a data write request from host 100 should be executed by first using flash memory 250 rather than disk 270. However, it is often rather more efficient to directly write data to disk 270 instead of writing it to flash memory 250. For example, where HDD 200 is already in the active state and host 100 makes a write request, data may be efficiently written directly to disk 270. Additionally, after a direct write operation to disk 270, it may also be prudent to store all the accumulated data in flash memory 250 to disk 270. Other examples of circumstances where it is more efficient to directly write data to disk 270 include a request (e.g., a cache flush CMD) by host 100 to flush the data stored in flash memory 250 to disk 270, or a data write request for a data block having a size greater than the remaining capacity of flash memory 250. Hereafter, an operation directly writing data to disk 270 in response to a host device request will be termed a "bypass write operation." By way of distinction, an operation writing data to disk 270 through flash memory 250 will be termed a "normal write operation."

Similarly, another principle established from the foregoing suggests that a read request from host 100 should be executed by first accessing flash memory 250 rather than disk 270. However, where HDD 200 is already in the active state, or where the requested read data do not stored in flash memory 250, the read request should be directly executed using disk 270. An operation directly reading requested data from disk 270 will be termed a "bypass read operation." An operation reading requested data from flash memory 250 will be termed a "normal read operation."

FIG. 7 is a block diagram for a data processing apparatus according to one embodiment of the present invention. Referring to FIG. 7, a HDD 200 of the data processing apparatus comprises a HDD controller 210, a (first) buffer 230, a (second buffer) flash memory 250, and a disk 270. Buffer 230 serves as a hard disk cache storing data received from host 100. Generally, in order to reduce a difference between the rotation speed of the disk 270 and the speed of data interface with host 100, HDD 200 includes buffer 230 performing a cache function. Buffer 230 may be implemented using a synchronous dynamic random access memory (SDRAM) adapted to high-speed data input/output operations.

Whenever data are received from host 100, HDD 200 stores the data in flash memory 250. Thereafter, when flash memory 250 is full, the stored data is simultaneously transferred to disk 270. However, when HDD 200 is in the active state, or when the size of the data in buffer 230 is larger than the remaining capacity of flash memory 250, the data from host 100 will be directly stored in disk 270. The HDD controller 210 controls a "normal data path" related to normal write operations and a "bypass data path" related to bypass write operations. An exemplary structure for HDD controller 210 will now be described in some additional detail.

Figure 8:
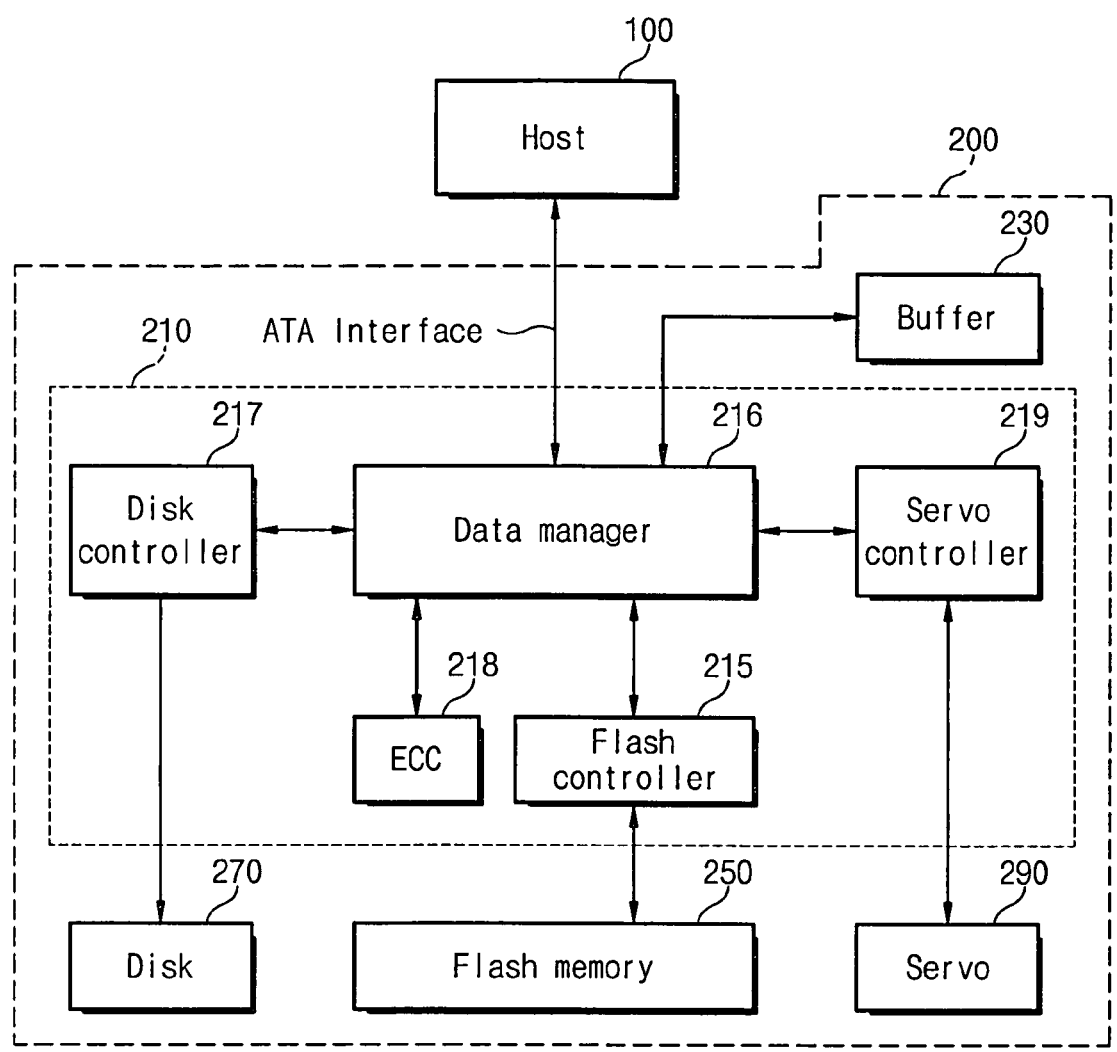
FIG. 8 is a block diagram further illustrating an HDD controller, such as The one incorporated in the HDD shown in FIG. 7.

FIG. 8 is a block diagram further illustrating HDD controller 210. Referring to FIG. 8, HDD controller 210 comprises a flash controller 215, a data manager 216, a disk controller 217, an ECC 218, and a servo controller 219.

Flash controller 215 controls the data write/read operations to/from flash memory 250. As is well understood by those skilled in the art, a data erase operation must be preceded by a data write operation to flash memory 250, and data written to flash memory 250 has a larger unit size than data erased therefrom. This makes it difficult not only to use flash memory 250 as a main memory, but also to utilize a file system for a general hard disk where flash memory 250 is used as an auxiliary or temporary memory. Accordingly, in order to conceal the data erase operation required by flash memory 250, flash controller 215 is provided with a flash translation layer (FTL).

During the write operation to flash memory 250, the FTL functions to map of logical addresses generated by the file system relative to the physical addresses of flash memory 250 on which the actual erase operation is performed. The address mapping operation of the FTL is described in, for example, in U.S. Pat. No. 5,404,485; U.S. Pat. No. 5,937,425; and U.S. Pat. No. 6,381,176, the subject matter of which is hereby incorporated by reference. Generally speaking, the FTL uses an address mapping table for a high-speed address mapping operation. The address mapping table is implemented using a relatively expensive SRAM (not shown). The FTL may be implemented in the form of hardware independent of host 100, or it may be implemented in the form of software, such as a device driver associated with an operating system in host 100. Alternatively, the functionality of flash controller 215 may be implemented in software associated with disk controller 217. However specifically implemented, flash memory 250 may be functionally viewed as a general buffer. However, where the functionality of flash controller 215 is implemented in software, a load for data verification requirement may increase. Accordingly, separate hardware, such as ECC 218, may be provided to implement in a dedicated manner the ECC generation function.

Data manager 216 detects the type of a command received from host 100, the operating state of disk 270, the size of data stored in buffer 230, and the remaining memory capacity of flash memory 250. Thereafter, on the basis of the detection results, data manager 216 determines whether to process a data write/read request received from host 100 through the normal data path or through the bypass data path. In one embodiment, it is assumed that data manager 216 exchanges data and/or messages with host 100 through an ATA interface or a serial-ATA interface.

Disk controller 217 controls the data input/output operations to buffer 230 and flash controller 215 according to the determined data path. Where flash controller 215 is not provided in the form of separate hardware within HDD 200, the function of flash controller 215 may be implemented in the form of software residing in disk controller 217. In such as a case, disk controller 217 controls the data input/output operation of flash memory 250 in software.

Servo controller 219 controls the physical operation of HDD 200, such as the function of a motor (e.g., a spindle motor). Although not illustrated in FIG. 7, a motor such as a servo motor 290 is provided within HDD 200 in order to rotate disk 270 during read/write operations.

Figure 9:
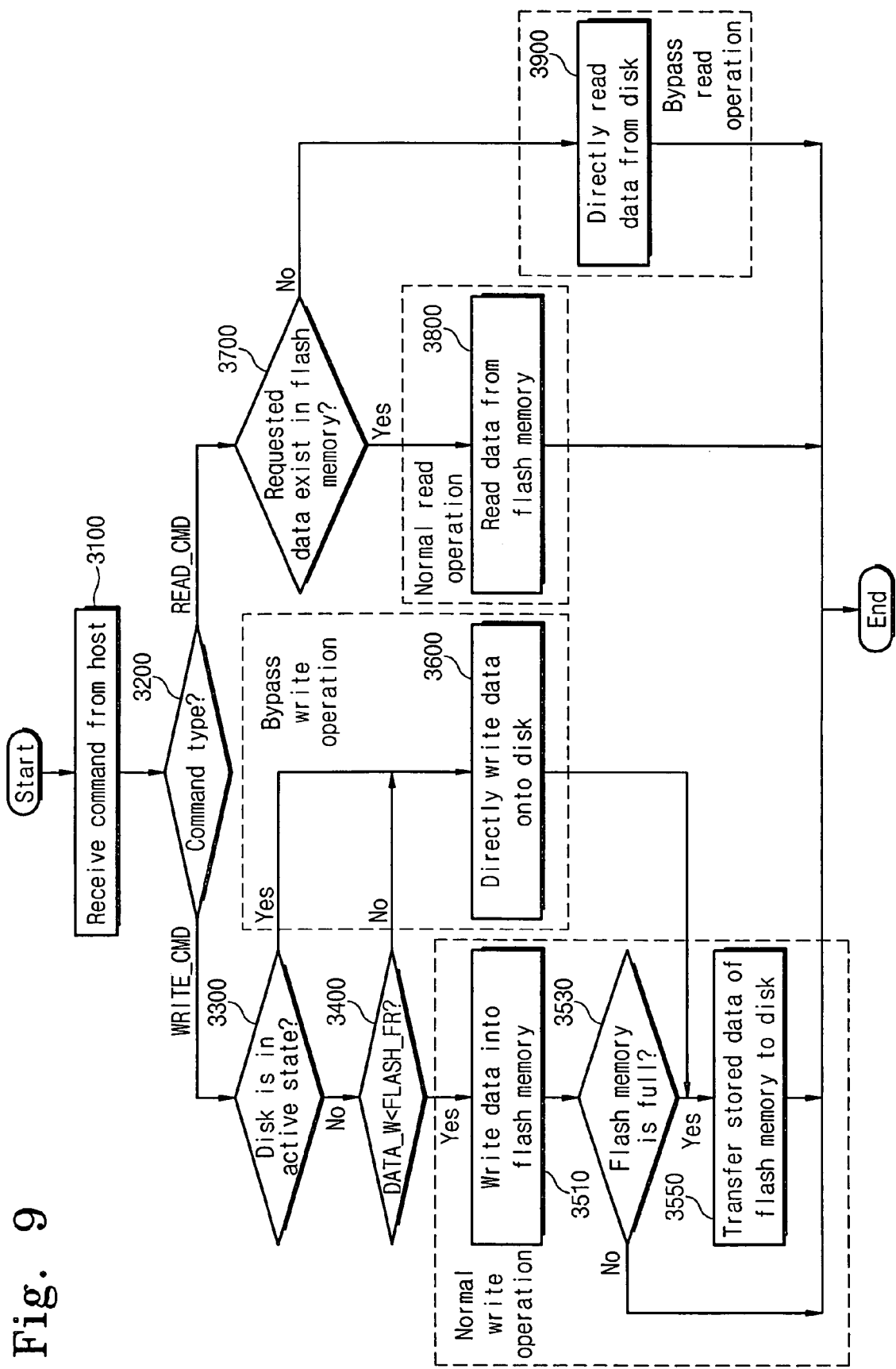
FIG. 9 is a flowchart illustrating a process of inputting data to and outputting data from a HDD according to an embodiment of the invention.

FIG. 9 is a flowchart further illustrating a method of inputting data to and outputting data from HDD 200 according to one embodiment of the invention. Specifically, FIG. 9 illustrates exemplarily data processing operations relative to one or more commands. Exemplary method steps are indicated in parentheses.

Referring to FIG. 9, HDD 200 first receives a command from host 100 (3100), and determines the type of the command (3200). If the command is determined to be a write command (WRITE_CMD) (3200), HDD 200 next determines whether or not disk 270 is in the active state (3300).

If the disk is not in the active state, HDD 200 determines whether or not the size (DATA_W) of the write data is smaller than the remaining memory capacity (FLASH_FR) of flash memory 250 (3400). If the size (DATA_W) is smaller than the remaining memory capacity (FLASH_FR), HDD 200 writes the corresponding data to flash memory 250 (3510). Thereafter, HDD 200 determines whether or not flash memory 250 is full (3530). If flash memory 250 is full, HDD 200 transfers the stored data in flash memory 250 to disk 270 (3550). As described above, the data write operation performed when disk 270 is not in the active state is called the normal write operation. During the normal write operation, flash memory 250 stores a part of the data received from host 100 and simultaneously stores the stored data into disk 270.

Returning now to method steps (3300 and 3400) in the flowchart, if disk 270 is in the active state or if the size (DATA_W) is larger than the remaining memory capacity (FLASH_FR) of flash memory 250, the data received from host 100 is directly written to disk 270 (3600). As described above, the data write operation performed when the disk is in the active state is called the bypass write operation. During the bypass write operation, the data from host 100 are directly written to disk 270.

Alternatively, if the command is determined to be a read command (READ_CMD) (3200), HDD 200 determines whether or not the requested data is stored in flash memory 250 (3700). If the requested data is stored in flash memory, HDD 200 reads the corresponding data from flash memory 250 (3800). As described above, the operation of reading data from flash memory 250 is called the normal read operation.

However, if the requested data is not stored in flash memory 250, HDD 200 reads the corresponding data from disk 270 (3900). As described above, the operation of directly reading data from disk 270 is called the bypass read operation.

As described above, data processing apparatus 300 incorporating HDD 200 processes data implicated by a command from host 100, and collectively and simultaneously stores processed data to disk 270. Accordingly, it is possible to reduce an occurrence ratio of the active state, which consumes a large amount of power, relative to the overall operation state of HDD 200, thereby reducing the power consumption of HDD 200 within operation of data processing apparatus 300. As flash memory 250 retains data written to its memory cell even when external power is turned OFF, data recoverability is excellent. Because power consumption is reduced, the battery life a mobile device incorporating the HDD may be extended. These benefits and others arise from the efficient provision of data input/output path(s) by embodiments of the invention in accordance with the operating state of the data storage device.

It will be apparent to those skilled in the art that various modifications and variations may be made in the foregoing embodiments. Thus, it is intended that the scope of the invention cover such modifications and variations and their equivalents. The scope of the invention rather than being limited to only the foregoing is defined by the following claims.

What is claimed is:

1. A hard disk drive comprising:
   a controller receiving a write request;
   a first buffer implemented in a Random Access Memory (RAM) receiving write data corresponding to the write request from the controller and temporarily storing the write data;
   a second buffer implemented in a nonvolatile memory, and,
   a disk configured to receive data from the first buffer and the second buffer;
   wherein, in response to the write request the controller:
      in response to detecting a first disk operating state, stores the write data temporarily stored in the first buffer in the second buffer, and
      in response to detecting a second disk operating state, transfers the write data temporarily stored in the first buffer to the disk without storing the write data in the second buffer.

2. The hard disk drive of claim 1, wherein the nonvolatile memory implementing the second buffer comprises flash memory.

3. The hard disk drive of claim 1, wherein the first disk operating state is a standby state or an idle stat, and the second disk operating state is an active state.

4. The hard disk drive of claim 3, wherein the controller comprises a data manager detecting the disk operating state, the size of the write data temporarily stored in the first buffer, and the remaining memory capacity of the second buffer.

5. The hard disk drive of claim 4, wherein the controller, in response to detecting the first disk operating state, stores the write data temporarily stored in the first buffer in the second buffer, provided that the detected remaining memory capacity of the second buffer is greater than the size of the write data temporarily stored in the first buffer.

6. The hard disk drive of claim 1, wherein the controller, in response to a received read request, reads requested data from the second buffer if the requested data is stored in the second buffer, and otherwise reads the requested data from the disk.

7. A data processing apparatus comprising:
a host generating a write request and a read request; and
a hard disk drive (HDD) comprising: a controller, a first buffer implemented in a Random Access Memory (RAM), a second buffer implemented in a nonvolatile memory, and a disk;
wherein the controller temporarily stores write data in the first buffer:
wherein the write data corresponds to the write request: and
wherein the controller, in response to the write request and a detected first disk operating state, executes a normal write operation comprising storing the write data temporarily stored in the first buffer to the second buffer, and, in response to the write request and a detected second disk operating states, executes a bypass write operation comprising storing the write data temporarily stored in the first buffer to the disk without storing the write data to the second buffer.

8. The data processing apparatus of claim 7, wherein the nonvolatile memory implementing the second buffer is flash memory.

9. The data processing apparatus of claim 7, wherein the first disk operating state is a standby state, or an idle state, and the second disk operating state is an active state.

10. The data processing apparatus of claim 9, wherein the controller comprises a data manager detecting the disk operating state, the size of the write data temporarily stored in the first buffer, and a remaining memory capacity of the second buffer.

11. The data processing apparatus of claim 10, wherein the controller executes the normal write operation only if the detected remaining memory capacity of the second buffer is greater than the size of the write data temporarily stored in the first buffer.

12. The data processing apparatus of claim 10, wherein the controller, in response to the read request, executes a normal read operation comprising reading the requested data from the second buffer if requested data is stored in the second buffer, and otherwise executes a bypass read operation comprising reading requested data from the disk.

13. A method for writing data to and reading data from a hard disk drive comprising a controller, a first buffer implemented in a Random Access Memory (RAM), a second buffer implemented in a nonvolatile memory, and a disk, the method comprising:
detecting a disk operating state;
receiving write data from a host and temporarily storing the write data in the first buffer; and
in response to a write request received from the host:
if the detected disk operating state is a first disk operating state, storing the write data temporarily stored in the first buffer in the second buffer and
if the detected disk operating state is a second disk operating state, storing the write data temporarily stored in the first buffer the disk without storing the write data to the second buffer, wherein the write data corresponds to the write request.

14. The method of claim 13, wherein the nonvolatile memory implementing the second buffer is flash memory.

15. The method of claim 14, wherein the first disk operating state is a standby state or an idle state, and the second disk operating state is an active state.

16. The method of claim 15, further comprising:
detecting the size of the write data temporarily stored in the first buffer and a remaining memory capacity of the second buffer.

17. The method of claim 16, wherein storing the write data temporarily stored in the first buffer in the second buffer occurs provided the detected remaining memory capacity of the second buffer is greater than the size of the write data temporarily stored in the first buffer.

18. The method of claim 13, further comprising:
in response to a read request received from the host:
if the requested data is stored in the second buffer reading the requested data from the second buffer; and
otherwise reading the requested data from the disk.

19. A method of reading/writing data within a data processing apparatus, the method comprising:
communicating a write request and corresponding write data from a host to a hard disk drive (HDD), the HDD comprising a controller, a first buffer implemented in a Random Access Memory (RAM), a second buffer implemented in a nonvolatile memory, and a disk;
detecting a disk operating state;
temporarily storing the write data in the first buffer; and
in response to the write request:
if the detected disk operating state is a first disk operating state,
executing a normal write operation comprising storing the write data temporarily stored in the first buffer t to the second buffer; and
if the detected disk operating state is a second disk operating state, executing a bypass write operation comprising storing the write data temporarily stored in the first buffer to the disk without storm the write data to the second buffer and subsequently transferring any data stored in the second buffer to the disk.

20. The method of claim 19, wherein the first disk operating state is an idle state a standby state, and the second disk operating state is an active state.

21. The method of claim 20, further comprising:
detecting the size of the write data temporarily stored in the first buffer and a remaining memory capacity the second buffer; and
wherein the normal write operation is only executed in response to the write request, provided if the remaining memory capacity the second buffer is greater than the size of the write data temporarily stored in the first buffer.

22. The method of claim 19, further comprising:
communicating a read request from the host to the HDD; and
in response to the read request:
if the requested data is stored in the second buffer executing a normal read operation comprising reading the requested data from the second buffer; and
otherwise executing a bypass read operation comprising reading the requested data from the disk.

* * * * *